US010909025B2

(12) United States Patent
He et al.

(10) Patent No.: US 10,909,025 B2
(45) Date of Patent: Feb. 2, 2021

(54) SYSTEM AND METHOD FOR AUTOMATING FUNCTIONAL TESTING

(71) Applicant: JPMorgan Chase Bank, N.A., New York, NY (US)

(72) Inventors: James He, Vernon Hills, IL (US); Bijay Singh Kunwar, Chigaco, IL (US); Maria Elena Zamora Kriegsmann, Chicago, IL (US); Blake Corley, Chicago, IL (US); Paul T. Dolce, Lombard, IL (US); Matthew Krecker, Morton Grove, IL (US); Sandra Lee, Chicago, IL (US); Pierre Glover, Lansing, IL (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/446,905

(22) Filed: Jun. 20, 2019

(65) Prior Publication Data
US 2019/0391907 A1 Dec. 26, 2019

Related U.S. Application Data
(60) Provisional application No. 62/688,741, filed on Jun. 22, 2018.

(51) Int. Cl.
*G06F 11/36* (2006.01)
(52) U.S. Cl.
CPC ...... *G06F 11/3664* (2013.01); *G06F 11/3684* (2013.01); *G06F 11/3688* (2013.01); *G06F 11/3692* (2013.01)
(58) Field of Classification Search
CPC .................................. G06F 11/3664–3692
See application file for complete search history.

(56) References Cited

U.S. PATENT DOCUMENTS

| 6,601,018 B1 * | 7/2003 | Logan | G06F 11/3684 702/186 |
| 6,701,514 B1 * | 3/2004 | Haswell | G06F 11/3664 707/999.102 |

(Continued)

OTHER PUBLICATIONS

Yoo et al., "Clustering Test Cases to Achieve Effective & Scalable Prioritisation Incorporating Expert Knowledge", published by ACM, ISSTA'09, Jul. 19-23, 2009, Chicago, Illinois, USA. pages 201-211 (Year: 2009).*

*Primary Examiner* — S. Sough
*Assistant Examiner* — Zheng Wei
(74) *Attorney, Agent, or Firm* — Greenblum & Bernstein, P.L.C.

(57) ABSTRACT

Various methods, apparatuses/systems, and media for implementing an automation suite module (ASM) for automated functional testing are provided. A receiver receives a request for testing an application. A repository stores a plurality of test classes related to the request. A processor accesses the repository; creates a plurality of packages, each package including one or more test classes among the plurality of test classes; causes, in response to receiving the request for testing the application, a graphical user interface (GUI) to display the plurality of packages with their respective test classes; generates, by utilizing the GUI, a plurality of test blocks by receiving selection of one or more test classes from one or more packages among the plurality of packages; generates, by utilizing the GUI, a custom test suite by receiving selection of one or more test blocks from the plurality of test blocks; and executes the test classes based on the custom test suite to test the application.

20 Claims, 11 Drawing Sheets

(56) References Cited

U.S. PATENT DOCUMENTS

| | | | | |
|---|---|---|---|---|
| 6,718,537 | B1* | 4/2004 | Miles | G06F 11/3688 |
| | | | | 714/E11.208 |
| 9,710,367 | B1* | 7/2017 | Nagineni | G06F 11/3684 |
| 2004/0073890 | A1* | 4/2004 | Johnson | G06F 11/3672 |
| | | | | 717/124 |
| 2008/0184206 | A1* | 7/2008 | Vikutan | G06F 11/3688 |
| | | | | 717/127 |
| 2012/0260129 | A1* | 10/2012 | Wilson | G06F 11/3688 |
| | | | | 714/32 |
| 2019/0340113 | A1* | 11/2019 | Earanti | G06F 11/3664 |

* cited by examiner

```
@Login(userId = "${sso.tech.lead.standard.sid}", password = "${sso.tech.lead.standard.password}", loginClass = SsoLogin.class)
public class TechnicalOptionsAllTechnicalRequestOptions extends BrowserTest {

@Test
@MetaInfo(author = "████████", story = "CITBACKOFFICE-████" , maintainedBy = "", description = "Verify error messages for Required fields on TO section")
@ExternalParameterFromFile(type = FileType.TAB_DELIMITED, value = "resources/parameters/TechnicalOptions.txt")
public void technicalOptionsErrorMessages(String scenario, String option,
    String elementId1, String type1, String value1, String required1, String message1,
    String elementId2, String type2, String value2, String required2, String message2,
    String elementId3, String type3, String value3, String required3, String message3,
    String elementId4, String type4, String value4, String required4, String message4,
    String elementId5, String type5, String value5, String required5, String message5,
    String elementId6, String type6, String value6, String required6, String message6,
    String elementId7, String type7, String value7, String required7, String message7,
    String elementId8, String type8, String value8, String required8, String message8,
    String elementId9, String type9, String value9, String required9, String message9,
    String elementId10, String type10, String value10, String required10, String message10,
    String elementId11, String type11, String value11, String required11, String message11) throws Exception
```

SYSTEM AND METHOD FOR AUTOMATING FUNCTIONAL TESTING

CROSS-REFERENCE TO RELATED APPLICATIONS

This application claims the benefit of U.S. Provisional Patent Application Ser. No. 62/688,741 filed Jun. 22, 2018, which is hereby incorporated by reference in its entirety.

TECHNICAL FIELD

This disclosure generally relates to automated testing of software application, and, more particularly, to methods and apparatuses for implementing an automation suite module for automating functional testing of software application using modifiable graphical user interfaces.

BACKGROUND

As software application becomes increasingly more complex, testing such software application also becomes more complex as a large number of unique combinations of paths and modules may be tested for each program. Conventional tools exist for automating software application testing. However, conventional tools may only provide for manual automation of software application testing (i.e., manual initiation/launching of the automation testing), and may lack frameworks for automated automation of software application testing. Moreover, many of these conventional tools may require writing code that may require specific skill set and expertise to develop in order to test the software application. Currently, no tools exist that may be configured for providing opinionated programming based automation suites for functional testing. For example, an automation tool such as Selenium may provide an automation framework that may allow developers to use code to interact with a browser, but does not contain the functionality that may be required to automate testcases easier by providing opinionated programming based automation suites for functional testing. Other similar conventional solutions may often include keyword or record/playback solutions which may be comparatively rigid, and may not provide flexibility and usability for a wide range of software coding skills.

SUMMARY

The present disclosure, through one or more of its various aspects, embodiments, and/or specific features or sub-components, provides, among other features, various systems, servers, devices, methods, media, programs, and platforms for implementing an automation suite module for developing functional tests and automating functional testing of software application using modifiable graphical user interfaces. The various aspects, embodiments, features, and/or sub-components provide optimized processes of implementing an automation suite module for making automating functional testing of software application much faster, easier and more efficient compared to conventional testing by using modifiable graphical user interfaces that may provide error tracking, reporting, a dashboard for choosing tests, and a platform for continuous integration capabilities without requiring any high level code developing skills. The various aspects, embodiments, features, and/or sub-components may also provide optimized processes of implementing an automation suite module that may provide a platform for opinionated programming based automation suites for automating functional testing of software application, and that may additionally provide flexibility and usability for a wide range of software coding skills. In addition, the various aspects, embodiments, features, and/or sub-components may also provide optimized processes of implementing an automation suite module that may provide a platform for automatically initiating/launching the automated functional testing because of continuous integration capabilities, thereby effecting an automated automation of functional testing of software application.

According to an aspect of the present disclosure, a method for implementing an automation suite module for automated functional testing by utilizing one or more processors and one or more memories is disclosed. The method may include: receiving a request for testing an application; accessing a repository that includes a plurality of test classes related to the request; creating a plurality of packages, each package including one or more test classes among the plurality of test classes; causing, in response to receiving the request for testing the application, a graphical user interface (GUI) to display the plurality of packages with their respective test classes; generating, by utilizing the GUI, a plurality of test blocks by receiving selection of one or more test classes from one or more packages among the plurality of packages; generating, by utilizing the GUI, a custom test suite by receiving selection of one or more test blocks from the plurality of test blocks; and executing the test classes based on the custom test suite to test the application.

According to a further aspect of the present disclosure, the method may further include: generating, by utilizing the GUI, a report comprising one or more graphs, one or more charts, or one or more encountered errors, based on the execution of the test classes.

According to yet another aspect of the present disclosure, the custom test suite may include a combination of at least one test class from a first package among the plurality of packages and at least one test class from a second package among the plurality of packages, and wherein the at least one test class from the first package is a different type of test class than the at least one class from the second package.

According to a further aspect of the present disclosure, the custom test suite may include a combination of two or more test classes each representing a different type of test class from one package among the plurality of packages and no test classes from other packages among the plurality of packages.

According to another aspect of the present disclosure, the method may further include: generating, by utilizing the GUI, a plurality of custom test suites by receiving selection of one or more test blocks for each custom test suite; and executing each test suite including corresponding test classes simultaneously in a parallel mode of operation.

According to an additional aspect of the present disclosure, the GUI may be a website user interface (Web UI) for configuring test execution settings and display analytics on each execution, and for providing a platform for continuous integration of test results.

According to yet another aspect of the present disclosure, the method may further include cleaning a testing environment after executing the test classes.

According to a further aspect of the present disclosure, a system for implementing an automation suite module for automated functional testing is disclosed. The system may include a processor; a receiver configured to receive a request for testing an application; and a repository having a memory that includes a plurality of test classes related to the request. The processor may be configured to: access the repository; create a plurality of packages, each package including one or more test classes among the plurality of test classes; cause a graphical user interface (GUI) to display said plurality of packages with their respective test classes; generate, by utilizing the GUI, a plurality of test blocks by selecting one or more test classes from one or more packages among the plurality of packages; generate, by utilizing the GUI, a custom test suite by selecting one or more of test blocks from the plurality of test blocks; and execute the test classes based on the custom test suite to test the application.

According to another aspect of the present disclosure, the processor may be further configured to generate, by utilizing the GUI, a report comprising one or more graphs, one or more charts, or one or more encountered errors, based on the execution of the test classes.

According to yet another aspect of the present disclosure, the processor may be further configured to: generate, by utilizing the GUI, a plurality of custom test suites by receiving selection of one or more test blocks for each custom test suite; and execute each test suite including corresponding test classes simultaneously in a parallel mode of operation.

According to an aspect of the present disclosure, wherein the GUI may be a website user interface (Web UI) and the processor may be further configured to cause the Web UI to configure test execution settings and display analytics on each execution, and provide a platform for continuous integration of test results.

According to a further aspect of the present disclosure, the processor may be further configured to clean a testing environment after executing the test classes.

According to another aspect of the present disclosure, a non-transitory computer readable medium configured to store instructions for implementing an automation suite module for automated functional testing is disclosed. The instructions, when executed, may cause a processor to perform the following: receiving a request for testing an application; accessing a repository that includes a plurality of test classes related to the request; creating a plurality of packages, each package including one or more test classes among the plurality of test classes; causing, in response to receiving the request for testing the application, a graphical user interface (GUI) to display the plurality of packages with their respective test classes; generating, by utilizing the GUI, a plurality of test blocks by receiving selection of one or more test classes from one or more packages among the plurality of packages; generating, by utilizing the GUI, a custom test suite by receiving selection of one or more test blocks from the plurality of test blocks; and executing the test classes based on the custom test suite to test the application.

According to a further aspect of the present disclosure, when executed, the instructions may further cause the processor to perform the following: generating, by utilizing the GUI, a report comprising one or more graphs, one or more charts, or one or more encountered errors, based on the execution of the test classes.

According to another aspect of the present disclosure, when executed, the instructions may further cause the processor to perform the following: generating, by utilizing the GUI, a plurality of custom test suites by receiving selection of one or more test blocks for each custom test suite; and executing each test suite including corresponding test classes simultaneously in a parallel mode of operation.

According to an aspect of the present disclosure, wherein the GUI may be a website user interface (Web UI), and the instructions, when executed, may cause the processor may configure the Web UI for configuring test execution settings and displaying analytics on each execution, and providing a platform for continuous integration of test results.

According to a further aspect of the present disclosure, when executed, the instructions may further cause the processor to clean a testing environment after executing the test classes.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 8 illustrates a graphical user interface for test execution summary report in implementing an automation suite module in accordance with an exemplary embodiment.

FIG. 10 illustrates a graphical user interface and exemplary opinionated programming test codes in implementing an automation suite module in accordance with an exemplary embodiment.

FIG. 11 illustrates exemplary opinionated programming test codes in implementing an automation suite module in accordance with an exemplary embodiment.

DETAILED DESCRIPTION

Figure 1:
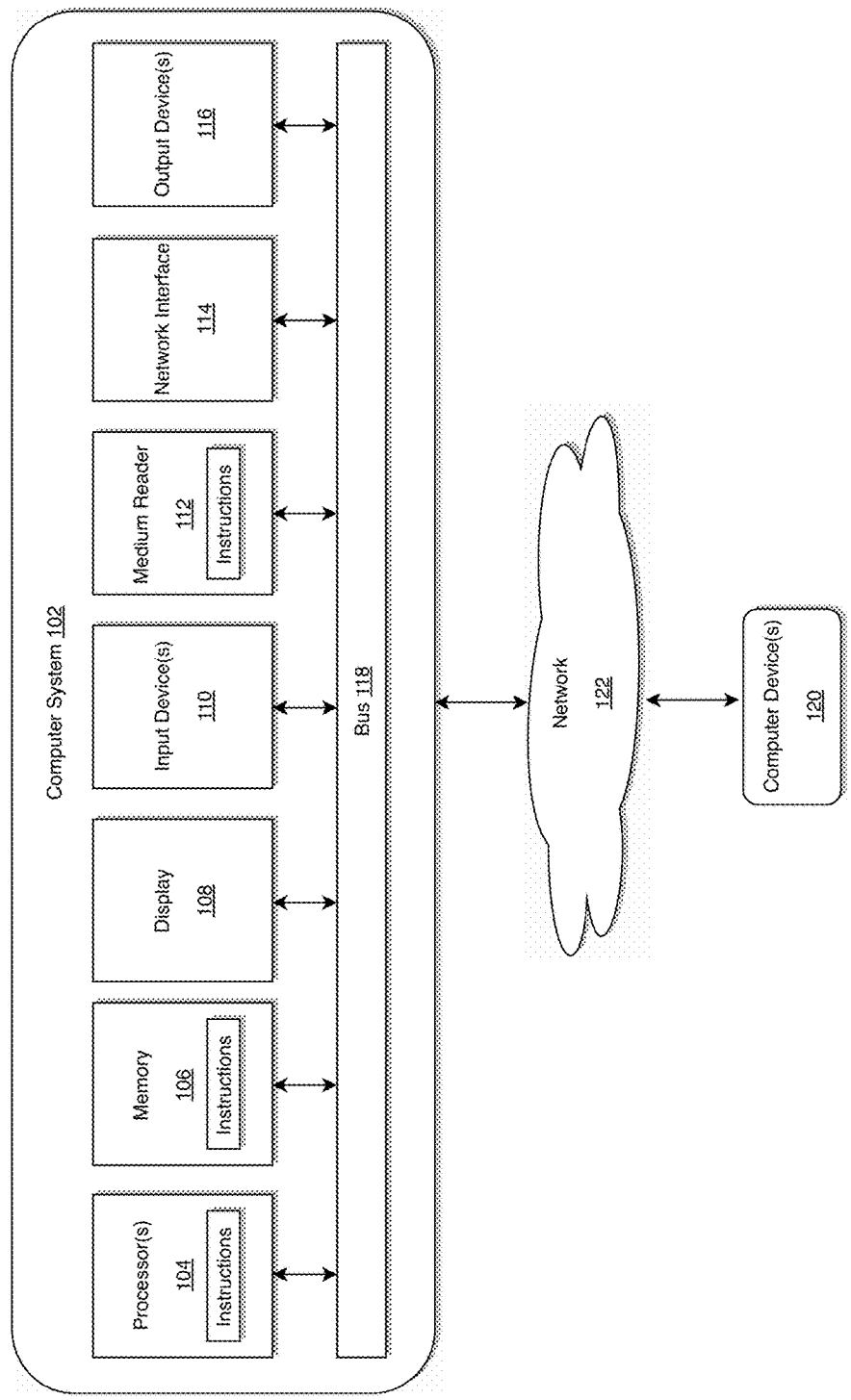
FIG. 1 illustrates a computer system for implementing an automation suite module in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

As described herein, various embodiments provide optimized processes of implementing an automation suite module for making automating functional testing of software application much faster, easier and more efficient compared to conventional testing by using modifiable graphical user interfaces that may provide error tracking, reporting, a dashboard for choosing tests, and a platform for continuous integration capabilities without requiring any high level code developing skills. As disclosed herein, the various aspects, embodiments, features, and/or sub-components may also provide optimized processes of implementing an automation suite module that may provide a platform for opinionated programming based automation suites for automating functional testing of software application, and that may additionally provide flexibility and usability for a wide range of software coding skills. In addition, various aspects, embodiments, features, and/or sub-components disclosed herein may also provide optimized processes of implementing an automation suite module that may provide a platform for automatically initiating/launching the automated functional testing because of continuous integration capabilities, thereby effecting an automated automation of functional testing of software application.

Figure 2:
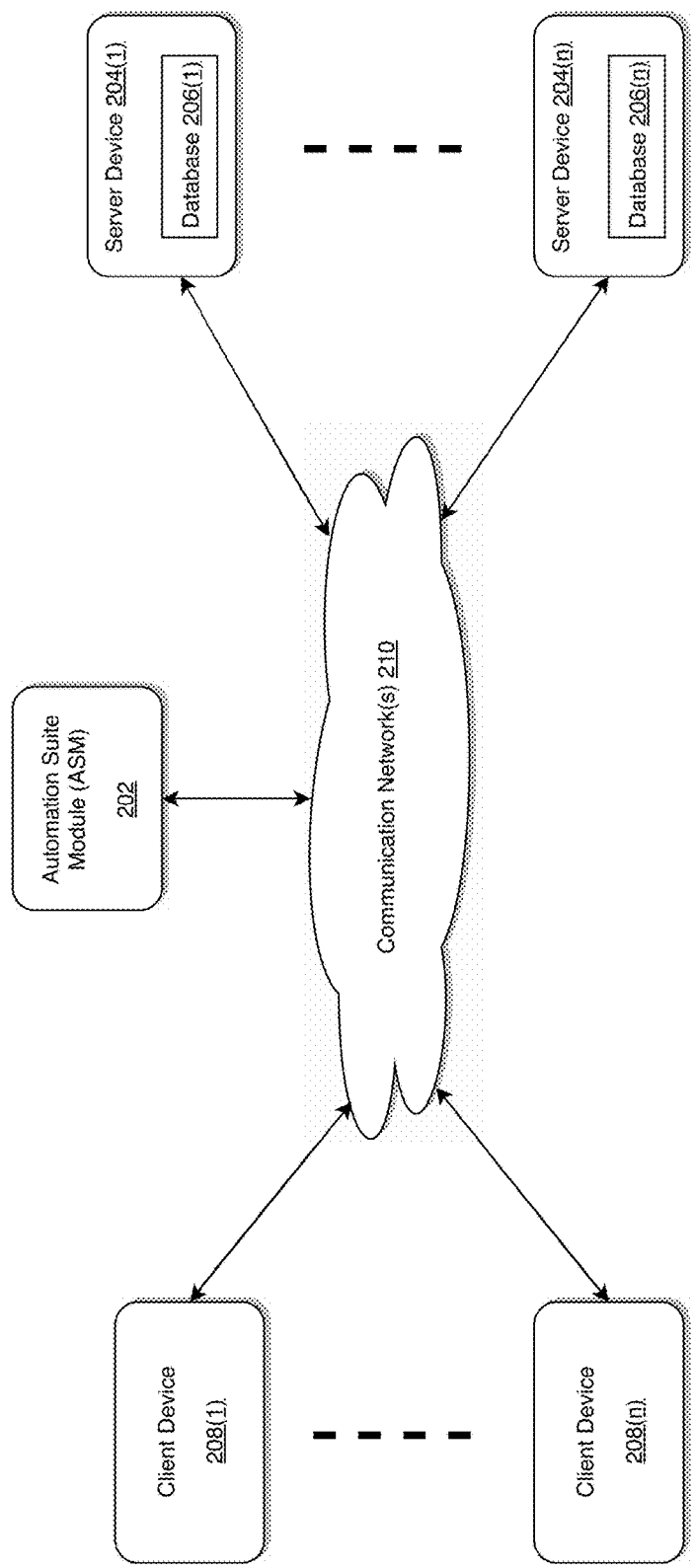
FIG. 2 illustrates an exemplary diagram of a network environment with an automation suite module in accordance with an exemplary embodiment.

Referring to FIG. 2, a schematic of an exemplary network environment 200 for implementing an automation suite module (ASM) of the instant disclosure is illustrated.

Conventional system, that does not implement an ASM of the instant disclosure, may not be able to automate the functional testing of software application and may not provide a platform to automate test cases easier by providing opinionated programming based automation suites for functional testing.

According to exemplary embodiments, the above-described problems associated with conventional approach of software application testing may be overcome by implementing an ASM 202 as illustrated in FIG. 2. The ASM 202 may be the same or similar to the computer system 102 as described with respect to FIG. 1. According to exemplary embodiments, the ASM 202 may be considered to be a two-way interactive communication device such as a mobile computing device, cellular phone, landline phone or an Internet appliance controller.

The ASM 202 may store one or more applications that can include executable instructions that, when executed by the ASM 202, cause the ASM 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the ASM 202 itself, may be located in virtual server(s) running in a cloud-based computing environment rather than being tied to one or more specific physical network computing devices. Also, the application(s) may be running in one or more virtual machines (VMs) executing on the ASM 202. Additionally, in one or more embodiments of this technology, virtual machine(s) running on the ASM 202 may be managed or supervised by a hypervisor.

In the network environment 200 of FIG. 2, the ASM 202 is coupled to a plurality of server devices 204(1)-204(n) that hosts a plurality of databases 206(1)-206(n), and also to a plurality of client devices 208(1)-208(n) via communication network(s) 210. A communication interface of the ASM 202, such as the network interface 114 of the computer system 102 of FIG. 1, operatively couples and communicates between the ASM 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the ASM 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The ASM 202 may be a standalone device or integrated with one or more other devices or apparatuses, such as one or more of the server devices 204(1)-204(n), for example. In one particular example, the ASM 202 may be hosted by one of the server devices 204(1)-204(n), and other arrangements are also possible. Moreover, one or more of the devices of the ASM 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the ASM 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the ASM 202 that may efficiently provide a platform for automatically initiating/launching the automated functional testing because of continuous integration capabilities, thereby effecting an automated automation of functional testing of software application. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communicate with the ASM 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the ASM 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the ASM 202, the server devices 204(1)-204(n), or the client devices 208(1)-208(n), for example, may be configured to operate as virtual instances on the same physical machine. For example, one or more of the ASM 202, the server devices 204(1)-204(n), or the client devices 208(1)-208(n) may operate on the same physical device rather than as separate devices communicating through communication network(s) 210. Additionally, there may be more or fewer ASMs 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
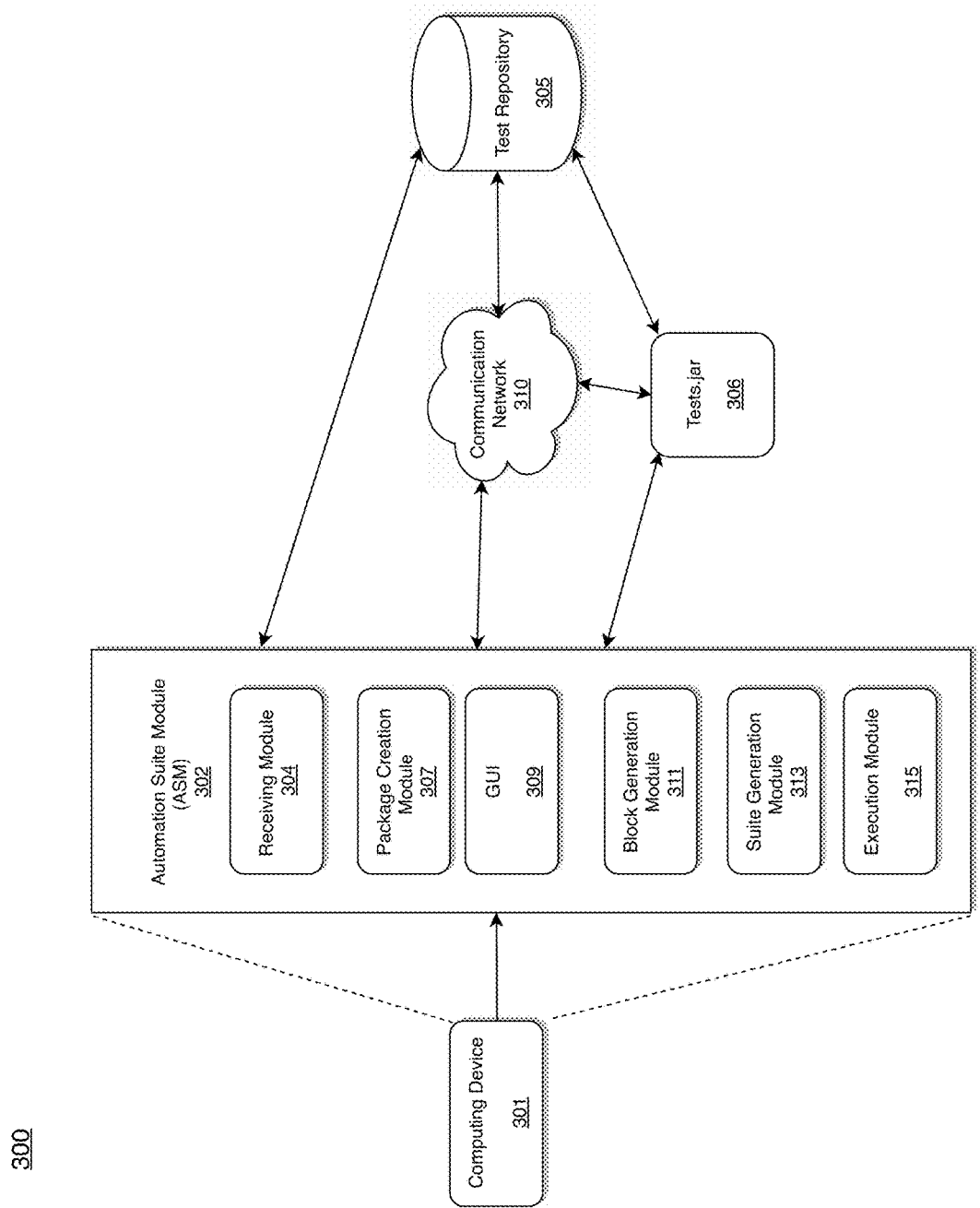
FIG. 3 illustrates a system diagram for implementing an automation suite module in accordance with an exemplary embodiment.

FIG. 3 illustrates a system diagram for implementing an automation suite module in accordance with an exemplary embodiment. According to exemplary embodiments, a system 300 is described and shown in FIG. 3 as including an ASM 302, although it may include other rules, policies, modules, databases, or applications, for example. As will be described below, the ASM 302 is configured for making automating functional testing of software application much faster, easier and more efficient compared to conventional testing by using modifiable graphical user interfaces that may provide error tracking, reporting, a dashboard for choosing tests, and a platform for continuous integration capabilities without requiring any high level code developing skills. As will be further described below, the ASM 302 is configured for improving processing speed of conventional functional testing of software application by using modifiable graphical user interfaces of the instant disclosure. In addition, according to exemplary embodiments, by executing test classes from a custom test suite generated by the ASM 302 reduces memory spaces for running a test for software application, thereby improving conventional processes of software application testing.

An exemplary system 300 may include a computing device 301 within which the ASM 302 may be embedded, a test repository 305, tests jar files 306, and a communication network 310. The computing device 301 may be the same or equivalent to the computing device 208 as illustrated in FIG. 2, the test repository 305 may include a memory (not shown) and may be the same or equivalent to the server 204 as illustrated in FIG. 2, and the communication network 310 may be the same or equivalent to the communication network 210 as illustrated in FIG. 2.

As shown in FIG. 3, the ASM 302 may include a receiving module 304, a package creation module 307, a graphical user interface (GUI) 309, a block generation module 311, a suite generation module 313, and an execution module 315.

The process may be executed via the communication network(s) 310, which may comprise plural networks as described above. For example, in an exemplary embodiment, the various components of the ASM 302 may communicate with the test repository 305 and a memory that includes the tests jar files 306 via the communication network(s) 310. Of course, these embodiments are merely exemplary and are not limiting or exhaustive.

According to exemplary embodiments, the receiving module 304 may be configured to receive a request for testing an application. The test repository 305 having a memory (not shown) may store a plurality of test classes related to the request, but the disclosure is not limited thereto. The ASM 302 may be configured to access the test repository 305 via the communication network(s) 310. The package creation module 307 may be configured to create a plurality of packages each including its corresponding test classes. Receiving a request for testing an application by the receiving module 304 may cause GUI 309 to display the plurality of packages with their respective test classes. The block generation module 311 may be configured to generate, by utilizing the GUI 309, a plurality of test blocks by receiving selection of one or more test classes from the plurality of packages. The suite generation module 313 may be configured to generate, by utilizing the GUI, a custom test suite by receiving selection of one or more test blocks from the plurality of test blocks. The execution module 315 may be configured to execute the test classes based on the custom test suite generated by the suite generation module 313 to test the application.

According to exemplary embodiments, the ASM 302 may be further configured to generate, by utilizing the GUI 309, a report comprising one or more graphs, one or more charts, or one or more encountered errors, based on the execution of the test classes by the execution module 315.

According to exemplary embodiments, the suite generation modules may be further configured to generate, by utilizing the GUI 309, a plurality of custom test suites by receiving selection of one or more test blocks for each custom test suite. According to exemplary embodiments, the execution module 315 may be configured to execute each test suite including corresponding test classes simultaneously in a parallel mode of operation.

According to exemplary embodiment, the GUI 309 may be a website user interface (Web UI) and the ASM 302 may be further configured to cause the Web UI to configure test execution settings and display analytics on each execution, and provide a platform for continuous integration of test results.

According to exemplary embodiments, the ASM 302 may be further configured to clean a testing environment after executing the test classes.

According to exemplary embodiments, test execution module 315 to execute the code based on the selected test classes in the test suite. A test class may be referred to the input required to confirm if instructions and methods used in developing an application or program are working correctly in delivering the desired output. The test class, in accordance with exemplary embodiments, may be referred to as a wrapper for test methods and there may be separate classes in different packages. A test block may be referred to as a wrapper for test classes that represents sprint features allowing a user to pick and choose what classes to include. According to exemplary embodiments, a sprint may be a set amount of time to complete a task/test case/test class. A test suite may be referred to as a wrapper for test blocks allowing a user to pick and choose which blocks to run. The test execution may be referred to as a wrapper for test suite to configure environment, browser, and execution of email settings as will be described below with reference to FIGS. 4-8. Test method, as disclosed herein, may be a written test case using ASM 302 framework in a JUnit format. JUnit is a framework for Java. According to exemplary embodiments, a wrapper function may be a subroutine in a software library or a computer program whose main purpose is to call a second subroutine or a system call with little or no additional computation. Wrapper functions, as disclosed herein, may be used to adapt an existing class or object to have a different interface. This may be especially useful when using existing library code. A test case, as disclosed herein, may be a set of actions executed to verify a particular feature or functionality of a software application. A test scenario, as disclosed herein, may be defined as any functionality that can be tested. A test scenario may be a collective set of test cases which may help a testing team to determine the positive and negative characteristics of a certain project.

As illustrated in FIG. 3, according to exemplary embodiments, the ASM 302 is configured for automating functional tests. The ASM 302 may provide a Java-based framework to code tests, but not limited thereto. According to exemplary embodiments, the ASM 302 is configured for providing an entire pipeline to easily code (even for non-coders) functional tests using guided utilities, into test projects that can be shared across teams by storing those test projects into the test repository 305, and to execute these tests by the execution module 315 with unique environmental parameters, and to report results across the platform via the GUI 309 (i.e., a web console). The automation suite effected by the ASM 302 may include, for example, three main components—framework libraries that stores test classes and/or test cases in a tests.jar 306 format; GUI 309 (i.e., web console); and execution module 315 (i.e., test runner/agent). According to exemplary embodiments, package generation, block generation, and suite generation by be performed by utilizing the web console (i.e., GUI 309). According to exemplary embodiments, teams may develop and store tests on a test project and deploy through Jenkins to the test repository 305. The execution module 315 (i.e., test runner/agent), by accessing the test repository 305, may read and run the test project based on custom environmental settings provided by the web console (i.e., GUI 309). According to exemplary embodiments, the web console (i.e., GUI 309) may be utilized to configure test execution settings as well as display analytics on each execution. For example, according to exemplary embodiments, the execution module 315 (i.e., test runner/agent) may be configured to integrate/read the test jar 306 files from the test repository 305 by utilizing, i.e., known reflection software processes, but the disclosure is not limited thereto. According to exemplary embodiments, the web console (i.e., GUI 309) may be configured to be linked to the execution module 315 (i.e., test runner/agent) to control the execution module 315 (i.e., test runner/agent). Thus, according to exemplary embodiments, a reflection-oriented programming component of the instant disclosure may allow monitoring via the GUI 309 the execution of test codes by the execution module 315 and may provide a platform for modifying the test codes via opinionated programming capabilities as disclosed later with reference to FIGS. 10 and 11.

According to exemplary embodiments, the framework libraries (i.e., tests.jar 306) may be connected via the communication network(s) 310 to an automation core module, an automation web module, and an automation utility module. According to exemplary embodiments, the automation core module, the automation web module, and the automation utility module may be embedded within the ASM 302. According to exemplary embodiments, the automation core module may include customized JUnit runner—a standard base test class and other core libraries that may bootstrap a JUnit framework. According to exemplary embodiments, the automation web module may include support for Selenium based browser test, WebDriver configuration, screenshot utilities, and support for Siteminder SSO login. According to exemplary embodiments, the automation utility module may be a repository of various utility classes that may encapsulate complex logic of a repetitive task and may provide easy to use Application Programming Interfaces (APIs). For example, the automation utility module may be any one of the following: WebdriverUtil, WebElementUtil, RandomValueUtil, DateUtil etc. According to exemplary embodiments, automation test project may be a Maven project with automation framework dependencies and may include JUnit based test classes that may contain test methods to cover different test scenarios for the execution module 315 to execute and run the automation test project.

According to exemplary embodiments, each application to be tested by the ASM 302 may include its own test project jar, thereby providing a modular pipeline to allow different teams to work with automation differently.

According to exemplary embodiments, teams may utilize a custom JUnit test project to create and store automation tests for the test runner (i.e., execution module 315) to execute. The built product may be a super jar file (i.e., tests jar 306) that may contain all information of test classes. Tests may follow, for example, a page object design pattern of implementation and may be run through JUnit for local development. According to exemplary embodiments, test projects may include the following features, but not limited thereto: login annotations that may be executed to be different per project (default may be an sso Login); test parameter annotations to easily tests with different data; meta-data annotations that may provide additional information on the tests; external-file parameter annotations to run tests using data from an external file; wait utilities; step functions to track automation steps; access to ASM 302's pre-created driver utilities or create own specifics to the project; deployable and version controllable.

According to exemplary embodiments, ASM 302 provides capabilities to read/execute test project jars and allow teams to focus on customizing test project jars by utilizing the suite generation module 313 and the GUI 309, without worrying how to run the jar. According to exemplary embodiments, the ASM 302 may include the following features, but not limited thereto: multi-threaded to complete more tests at the same time; stability features to handle unexpected crashing of drivers; cleanup testing environment after tests; log files for test runner failures; and email test results and links to a detailed report on the web console.

For example, according to an exemplary embodiment, the ASM 302 may be configured to utilize ParallelComputer class provided by JUnit to run each class on a separate thread. The ASM 302 may create a custom code that may control the number of classes per execution using external property (i.e., max.class.per.execution=4).

According to an exemplary embodiment, the ASM 302 may be configured to provide a WebdriverContainer class which may maintain map of web drivers for each thread based on thread ID. For example, at the beginning of each test case (Junit method) it may check for the browser availability for that thread and create new one if it doesn't exist. Also, ASM 302 may check for the crashed driver by calling the driver API to obtain the title of the browser page—if no response received, then a new thread may be created to stop the browser process, thereby effectively utilizing the computing resources and improving the performance of the ASM 302. All this happens within a retry loop that may also be controlled by an external property. This way, the test runner may handle crashed webdriver instance for the execution (i.e., webdriver.create.max.retry=3).

According to exemplary embodiments, cleaning of the testing environment may relate to deallocating the computing resources for the execution of the test classes, resetting the configurations changed due to the executed test class.

Figure 4:
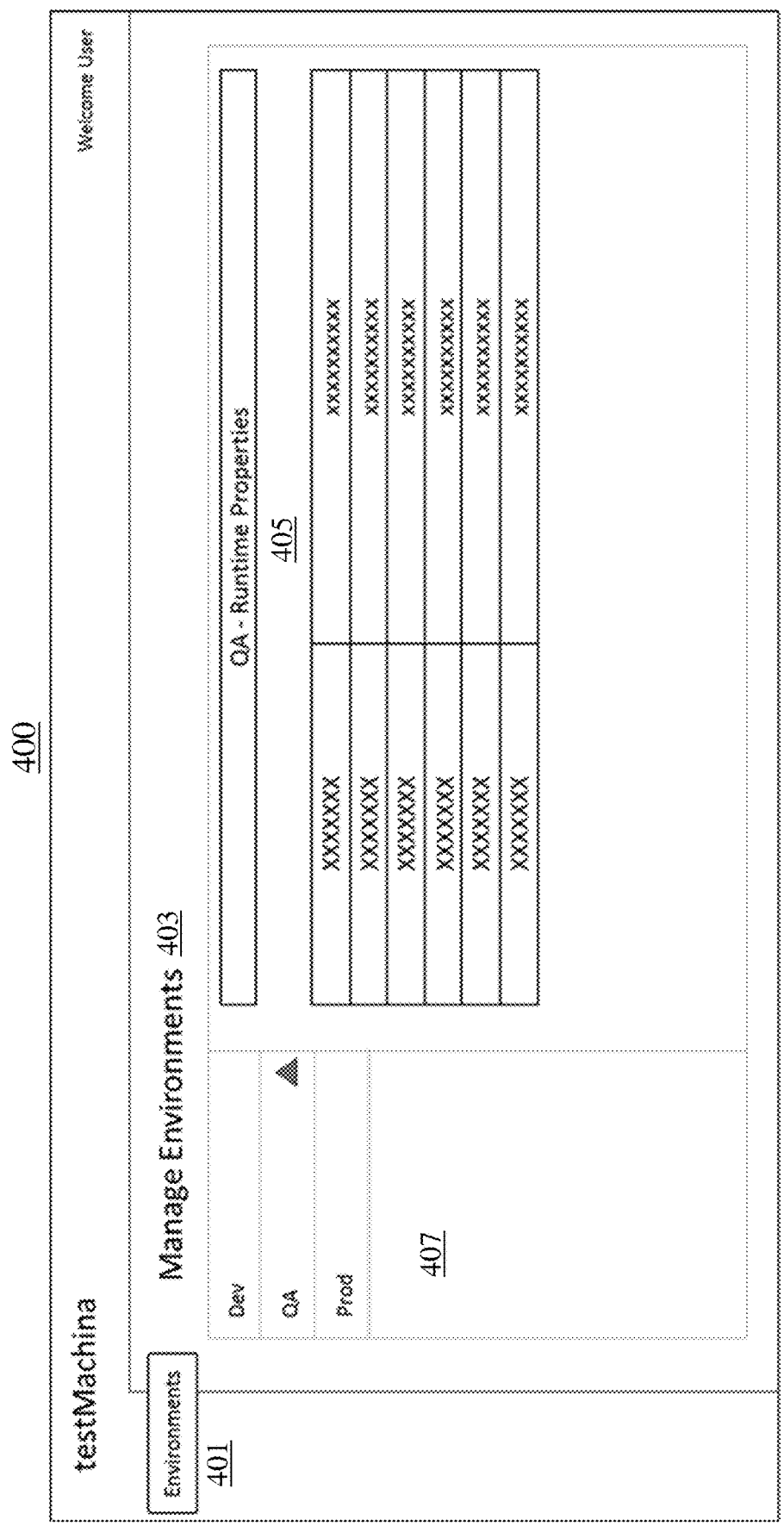
FIG. 4 illustrates a graphical user interface for environment management in implementing an automation suite module in accordance with an exemplary embodiment.

FIG. 4 illustrates a graphical user interface for environment management in implementing an automation suite module in accordance with an exemplary embodiment. FIG. 4 provides a screenshot of a GUI 400 illustrating one example embodiment of environment management in implementing the ASM 302 of FIG. 3, and configured to perform the previously described techniques of FIG. 3. As illustrated in FIG. 4, the GUI 400 may expose the functionality of the presently described ASM 302 with referring to FIG. 3 with a variety of input fields and selectable options. The GUI 400 may specifically provide menus or other selectable interfaces such as a menu 401 enabling selection and manipulation of environments, a menu 407 enabling selection and manipulation for managing environments 403, and various other selections and options within the interface menu 405 that illustrates quality assurance (QA) for runtime properties.

Figure 5:
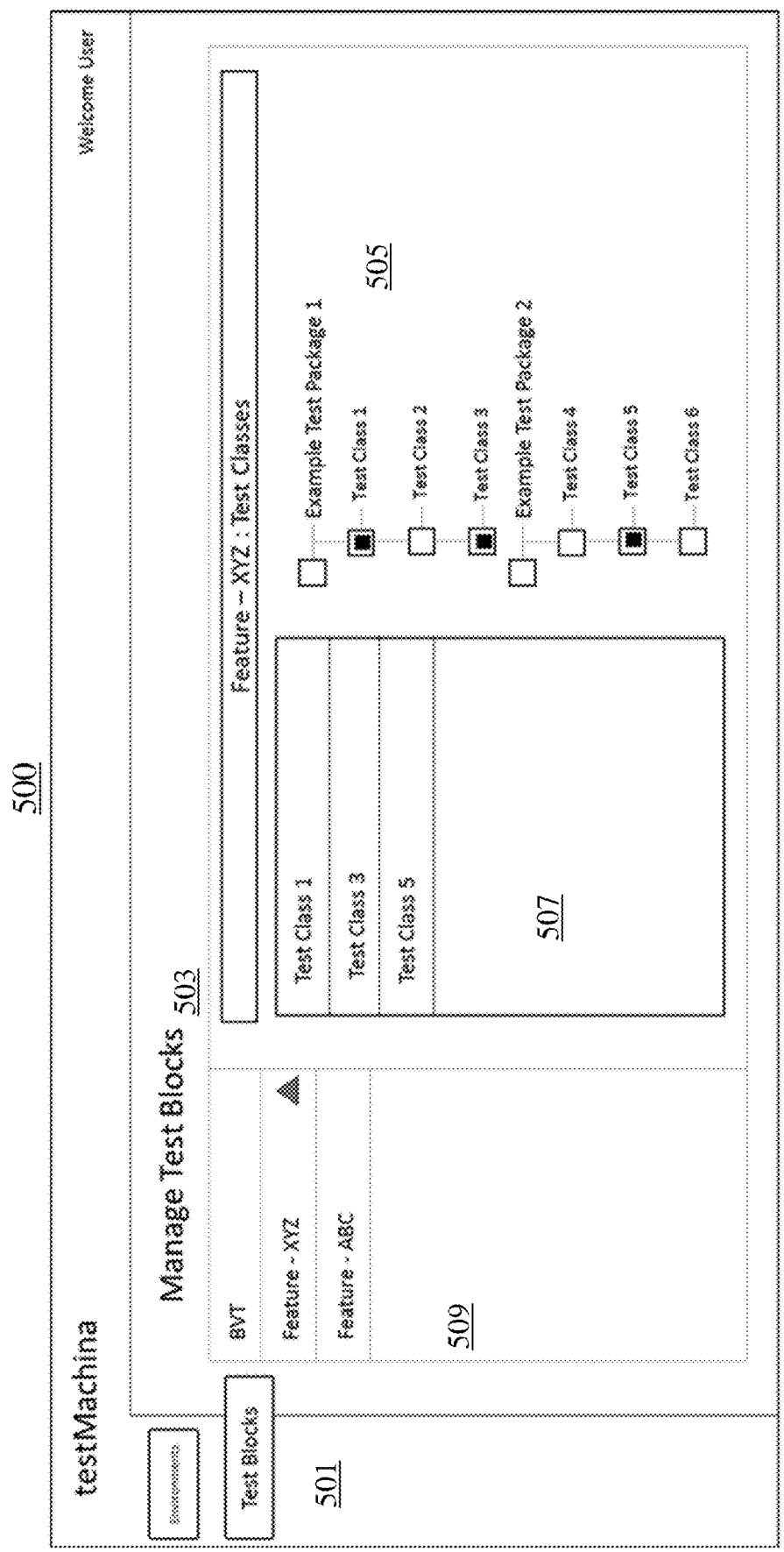
FIG. 5 illustrates a graphical user interface for test block management in implementing an automation suite module in accordance with an exemplary embodiment.

FIG. 5 illustrates a graphical user interface for test block management in implementing an automation suite module in accordance with an exemplary embodiment. FIG. 5 provides a screenshot of a GUI 500 illustrating one example embodiment of test block management in implementing the ASM 302 of FIG. 3, and configured to perform the previously described techniques of FIG. 3. As illustrated in FIG. 5, the GUI 500 may expose the functionality of the presently described ASM 302 with referring to FIG. 3 with a variety of input fields and selectable options. The GUI 500 may specifically provide menus or other selectable interfaces such as a menu 501 enabling selection and manipulation of test blocks, an icon 509 enabling selection and manipulation for managing test blocks 503, and various other selections and options within the interface menu 505 that illustrates that test class 1 and test class 3 have been selected from test package 1 and test class 5 has been selected from test package 2. According to exemplary embodiments, the interface menu 507 illustrates that the test block includes selected test class 1, test class 3, and test class 5.

Figure 6:
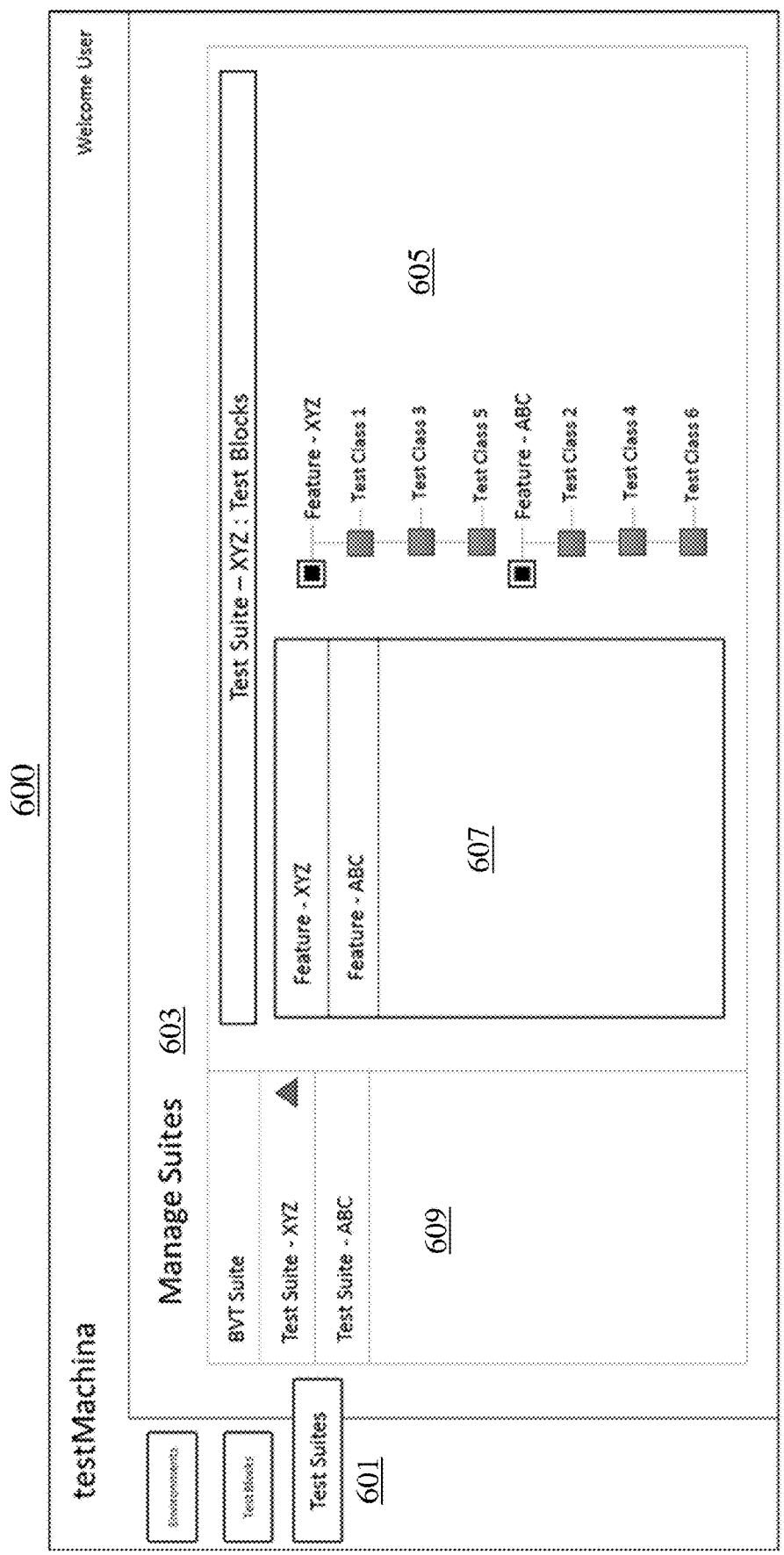
FIG. 6 illustrates a graphical user interface for test suite management in implementing an automation suite module in accordance with an exemplary embodiment.

FIG. 6 illustrates a graphical user interface for test suite management in implementing an automation suite module in accordance with an exemplary embodiment. FIG. 6 provides a screenshot of a GUI 600 illustrating one example embodiment of test suite management in implementing the ASM 302 of FIG. 3, and configured to perform the previously described techniques of FIG. 3. As illustrated in FIG. 6, the GUI 600 may expose the functionality of the presently described ASM 302 with referring to FIG. 3 with a variety of input fields and selectable options. The GUI 600 may specifically provide menus or other selectable interfaces such as a menu 601 enabling selection and manipulation of test suites, a menu 609 enabling selection and manipulation for managing test suites 603, and various other selections and options within the interface menu 605 that illustrates that feature XYZ that includes test class 1, test class 3, and test class 5 and feature ABC that includes test class 2, test class 4, and test class 6 have been selected. According to exemplary embodiments, the interface menu 607 illustrates that the test suite 601 includes the feature XYZ and the feature ABC.

According to exemplary embodiments, the custom test suite 601 may include a combination of at least one test class from a first package among the plurality of packages and at least one test class from a second package among the plurality of packages, and wherein the at least one test class from the first package is a different type of test class than the at least one class from the second package.

According to exemplary embodiments, the custom test suite 601 may include a combination of two or more classes each representing a different type of class from one package among the plurality of packages and no classes from other packages among the plurality of packages.

Figure 7:
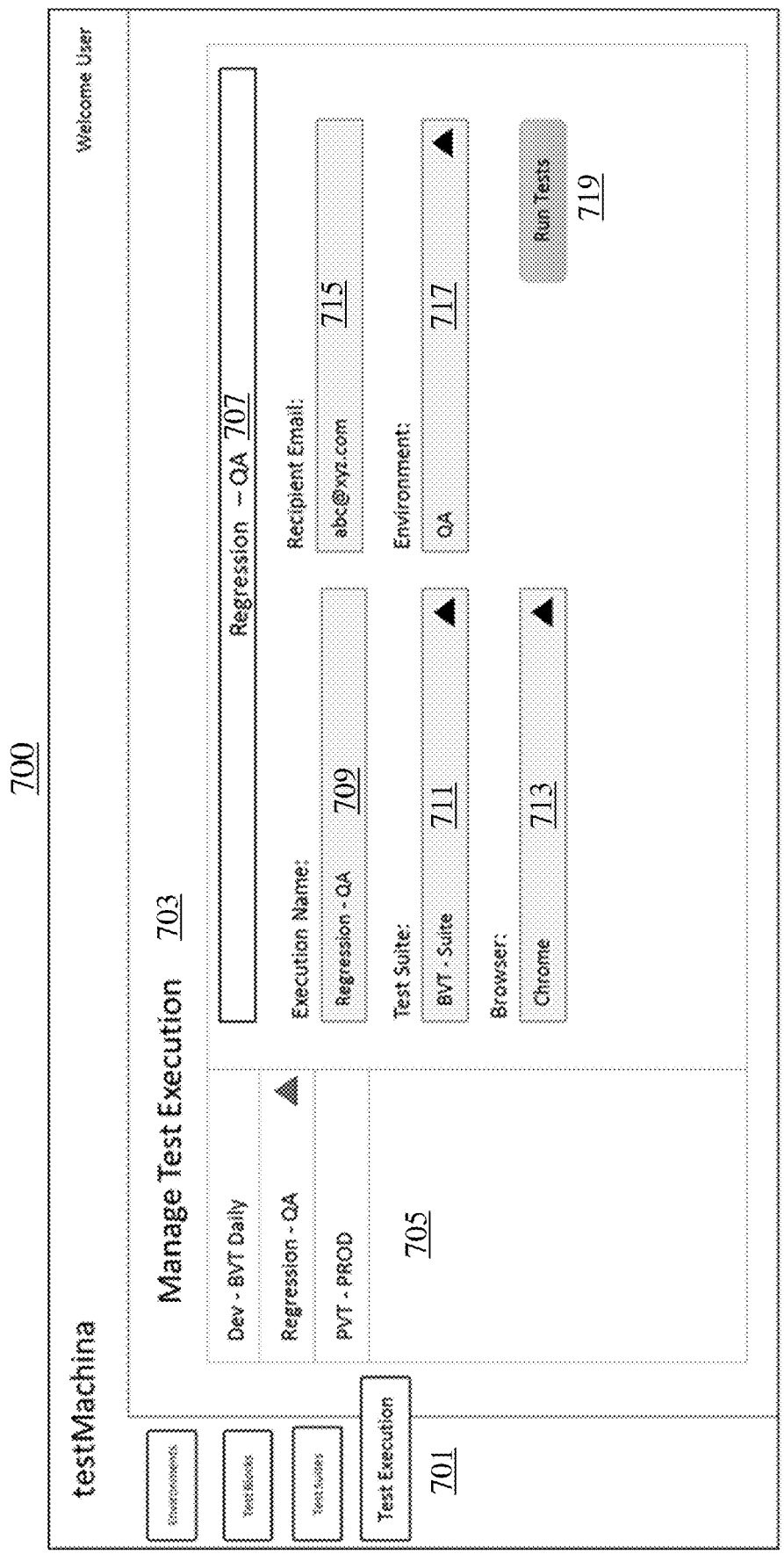
FIG. 7 illustrates a graphical user interface for test execution management in implementing an automation suite module in accordance with an exemplary embodiment.

FIG. 7 illustrates a graphical user interface for test execution management in implementing an automation suite module in accordance with an exemplary embodiment. FIG. 7 provides a screenshot of a GUI 700 illustrating one example embodiment of test execution management in implementing the ASM 302 of FIG. 3, and configured to perform the previously described techniques of FIG. 3. As illustrated in FIG. 7, the GUI 700 may expose the functionality of the presently described ASM 302 with referring to FIG. 3 with a variety of input fields and selectable options. The GUI 700 may specifically provide menus or other selectable interfaces such as a menu 701 enabling selection and manipulation of test execution feature, a menu 707 enabling selection and manipulation for managing test execution 703, and various other selections and options within the interface menu 707 that illustrates execution name 709, test suite 711, browser 713, recipient email 715, environment 717, and run tests icon 719.

Figure 8:
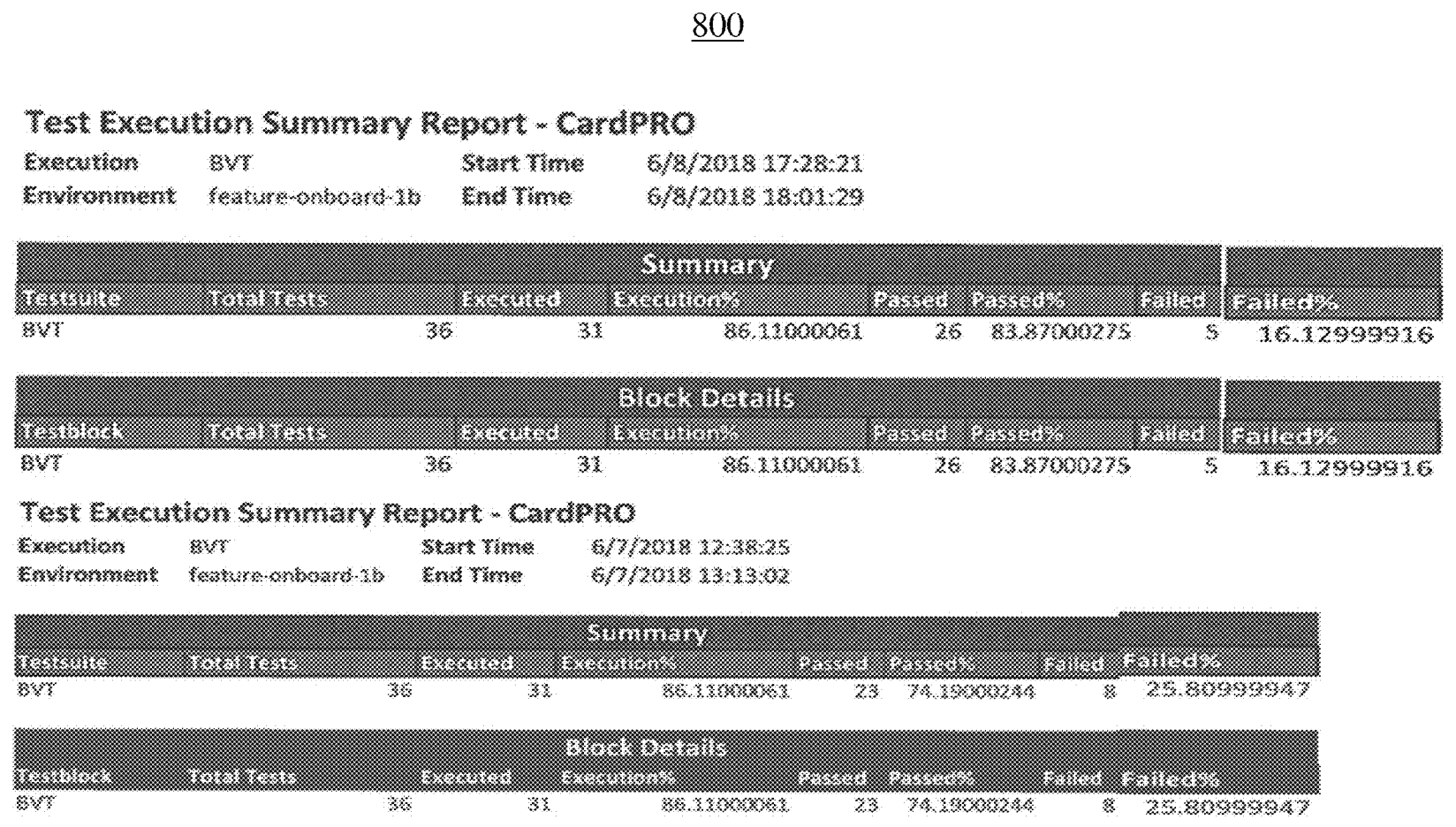

FIG. 8 illustrates a graphical user interface for test execution summary report in implementing an automation suite module in accordance with an exemplary embodiment. FIG. 8 provides a screenshot of a GUI 800 illustrating one example embodiment of test execution summary report in implementing the ASM 302 of FIG. 3, and configured to perform the previously described techniques of FIG. 3. According to exemplary embodiments, the summary report as illustrated by the GUI 800 includes that among 36 total tests, 31 tests have been executed in which 26 tests passed and 5 tests failed. According to exemplary embodiments, the summary report as illustrated by the GUI 800 includes that about 84% of the executed tests passed and about 16% of the executed test failed. It should be appreciated that the summary report as illustrated by the GUI 800 may report other form or results, e.g., line graphs, pie charts, block diagrams, etc., to illustrates test results executed by the execution module 315.

Figure 9:
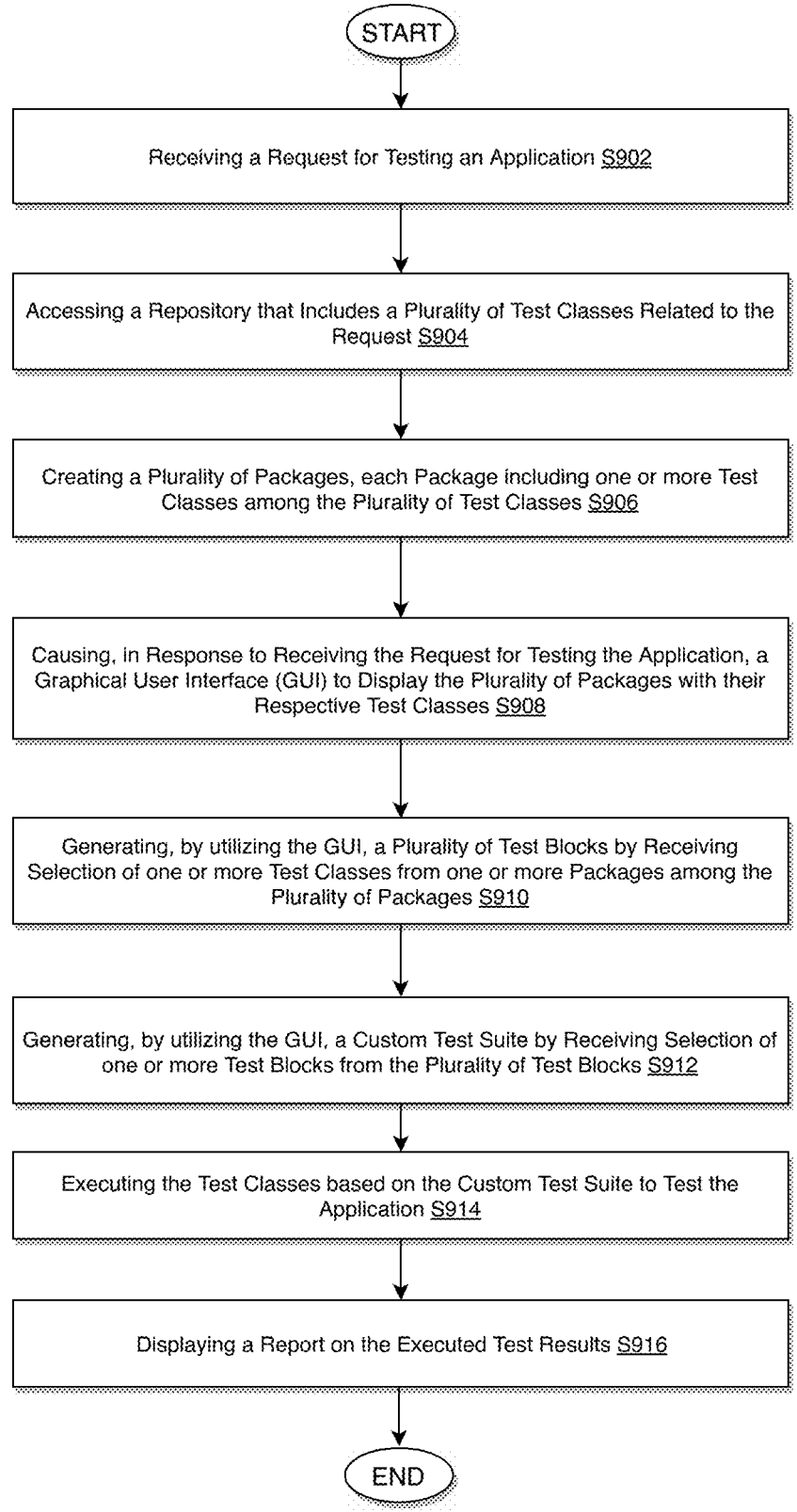
FIG. 9 illustrates a flow chart for implementing an automation suite module in accordance with an exemplary embodiment.

FIG. 9 illustrates a flow chart for implementing an automation suite module in accordance with an exemplary embodiment. The automation suite module may be the same or similar to the ASMs illustrated herein with reference to FIGS. 2-8, but the disclosure is not limited thereto.

In the process 900 of FIG. 6, at step S902, a receiving module may receive a request for testing an application. The receiving module may be the same or similar to the receiving module 304 illustrated herein with reference to FIG. 3 above, but the disclosure is not limited thereto.

At step S904, a repository may be accessed that includes a plurality of test classes related to the request. The repository may be the same or similar to the test repository 305 illustrated herein with reference to FIG. 3 above, but the disclosure is not limited thereto.

At step S906, a package creation module may create a plurality of packages each including its corresponding test classes. The package creation module may be the same or similar to the package creation module 307 illustrated herein with reference to FIG. 3 above, but the disclosure is not limited thereto.

At step S908, in response to receiving the request for testing the application, a graphical user interface (GUI) may display the plurality of packages with their respective test classes. The GUI may be the same or similar to the GUIs 309, 400, 500, 600, 700, and 800 illustrated herein with reference to FIGS. 3-8 above, but the disclosure is not limited thereto.

At step S910, a block generation module may generate, by utilizing the GUI, a plurality of test blocks by receiving selection of one or more test classes from the plurality of packages. The block generation module may be the same or similar to the block generation module 311 illustrated herein with reference to FIG. 3 above, but the disclosure is not limited thereto.

At step S912, a suite generation module may generate, by utilizing the GUI, a custom test suite by receiving selection of one or more test blocks from the plurality of test blocks. The suite generation module may be the same or similar to the suite generation module 313 illustrated herein with reference to FIG. 3 above, but the disclosure is not limited thereto.

At step S914, an execution module may execute the test classes based on the custom test suite to test the application. The execution module may be the same or similar to the execution module 315 illustrated herein with reference to FIG. 3 above, but the disclosure is not limited thereto.

At step S916, the process 900 may further include: generating, by utilizing the GUI, a report comprising one or more graphs, one or more charts, or one or more encountered errors, based on the execution of the test classes.

According to exemplary embodiments, the process 900 may further include: generating, by utilizing the GUI, a plurality of custom test suites by selecting one or more test blocks for each custom test suite; and executing each test suite including corresponding test classes simultaneously in a parallel mode of operation.

According to exemplary embodiments, the process 900 may further include cleaning a testing environment after executing the test classes.

Figure 10:
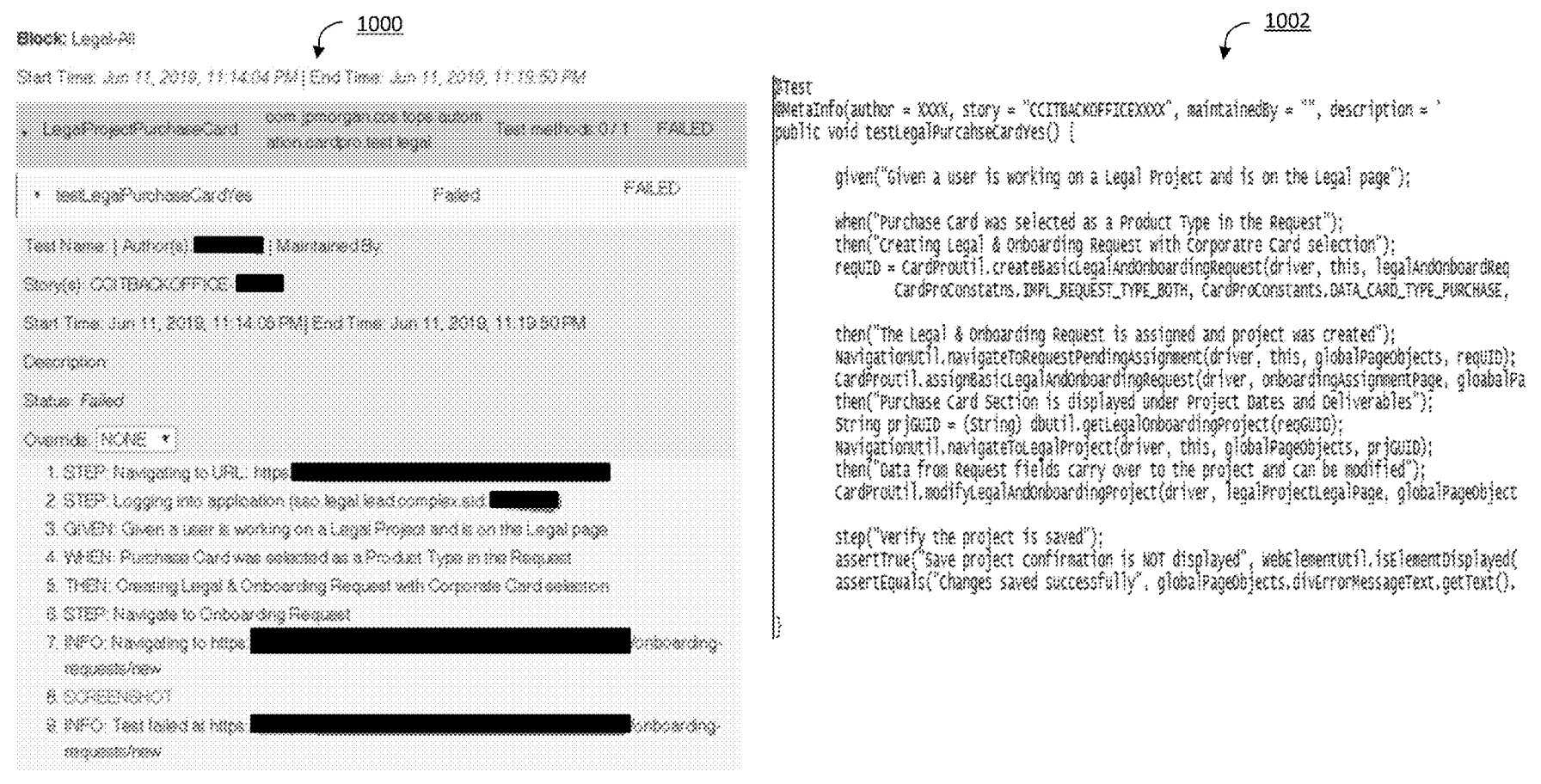

FIG. 10 illustrates a graphical user interface and exemplary opinionated programming test codes in implementing an automation suite module in accordance with an exemplary embodiment. According to exemplary embodiments, FIG. 10 illustrates how the exemplary opinionated test codes 1002 may relate directly to reporting via the GUI 1000. For example, the various aspects of the exemplary opinionated test codes 1002 illustrated in FIG. 10 may provide optimized processes of implementing an automation suite module in accordance with the exemplary embodiments disclosed above that may provide a platform for opinionated programming based automation suites for automating functional testing of software application, thereby providing flexibility and usability for a wide range of software coding skills.

FIG. 11 illustrates exemplary opinionated programming test codes in implementing an automation suite module in accordance with an exemplary embodiment. For example, FIG. 11 illustrates some examples of custom annotations provided for opinionated development. FIG. 11 also illustrates how the opinionated programming test codes 1100 may report functional tests in accordance with the exemplary embodiments disclosed above in the same way they have been coded without being keyword driven.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for implementing an automation suite module for automated functional testing by utilizing one or more processors and one or more memories, the method comprising:
   receiving a request for testing an application;
   accessing a repository that includes a plurality of test classes related to the request;
   creating a plurality of packages, each package including one or more test classes among the plurality of test classes;
   causing, in response to receiving the request for testing the application, a graphical user interface (GUI) to display the plurality of packages with their respective test classes;
   generating, by utilizing the GUI, a plurality of test blocks by receiving selection of one or more test classes from one or more packages among the plurality of packages, wherein each of the plurality of test blocks is a wrapper for the at least one selected test classes that represents a sprint feature allowing a user to pick and choose what classes to include based on a set amount of time to complete the at least one selected test classes;
   generating, by utilizing the GUI, a custom test suite by receiving selection of one or more test blocks from the plurality of test blocks;
   executing the test classes based on the custom test suite to test the application, wherein each of the executed test classes executes on a separate thread; and
   handling unexpected crashing of drivers during the execution of the test classes by: maintaining a map of the drivers for each of the separate thread based on thread ID (identification), checking for crashed driver by calling API (application programming interface) of the drivers based on a controlled retry loop, and creating a new thread to handle the crashed driver if no response received after the calling.

2. The method according to claim 1, further comprising: generating, by utilizing the GUI, a report comprising one or more graphs, one or more charts, or one or more encountered errors, based on the execution of the test classes.

3. The method according to claim 1, wherein the custom test suite includes a combination of at least one test class from a first package among the plurality of packages and at least one test class from a second package among the plurality of packages, and wherein the at least one test class from the first package is a different type of test class than the at least one class from the second package.

4. The method according to claim 1, wherein the custom test suite includes a combination of two or more test classes each representing a different type of test class from one package among the plurality of packages and no test classes from other packages among the plurality of packages.

5. The method according to claim 1, further comprising:
   generating, by utilizing the GUI, a plurality of custom test suites by selecting one or more test blocks from the plurality of test blocks for each of the plurality of custom test suites; and
   executing each of the Plurality of custom test suites including corresponding test classes simultaneously in a parallel mode of operation.

6. The method according to claim 1, wherein the GUI is a website user interface for configuring test execution settings and display analytics on each execution, and for providing a platform for continuous integration of test results.

7. The method according to claim 1, further comprising cleaning a testing environment after executing the test classes.

8. A system for implementing an automation suite module for automated functional testing, comprising:
   a processor;
   a receiver configured to receive a request for testing an application; and a repository having a memory that includes a plurality of test classes related to the request;
wherein the processor is configured to:
access the repository;
create a plurality of packages, each package including one or more test classes among the plurality of test classes;
cause a graphical user interface (GUI) to display said plurality of packages with their respective test classes;
generate, by utilizing the GUI, a plurality of test blocks by selecting one or more test classes from one or more packages among the plurality of packages, wherein each of the plurality of test blocks is a wrapper for the at least one selected test classes that represents a sprint feature allowing a user to pick and choose what classes to include based on a set amount of time to complete the at least one selected test classes;
generate, by utilizing the GUI, a custom test suite by selecting one or more of test blocks from the plurality of test blocks;
execute the test classes based on the custom test suite to test the application, wherein each of the executed test classes executes on a separate thread; and
handle unexpected crashing of drivers during the execution of the test classes by: maintaining a map of the drivers for each of the separate thread based on thread ID (identification), checking for crashed driver by calling API (application programming Interface) of the drivers based on a controlled retry loop, and creating a new thread to handle the crashed driver if no response received after the calling.

9. The system according to claim 8, wherein the processor is further configured to generate, by utilizing the GUI, a report comprising one or more graphs, one or more charts, or one or more encountered errors, based on the execution of the test classes.

10. The system according to claim 8, wherein the custom test suite includes a combination of at least one test class from a first package among the plurality of packages and at least one test class from a second package among the plurality of packages, and wherein the at least one test class from the first package is a different type of test class than the at least one class from the second package.

11. The system according to claim 8, wherein the custom test suite includes a combination of two or more test classes each representing a different type of test class from one package among the plurality of packages and no test classes from other packages among the plurality of packages.

12. The system according to claim 8, wherein the processor is further configured to:
generate, by utilizing the GUI, a plurality of custom test suites by selecting one or more test blocks from the plurality of test blocks for each of the Plurality of custom test suites; and
execute each of the plurality of custom test suites including corresponding test classes simultaneously in a parallel mode of operation.

13. The system according to claim 8, wherein the GUI is a website user interface for configuring test execution settings, displaying analytics on each execution, and for providing a platform for continuous integration of test results after executing the test classes.

14. The system according to claim 8, wherein the processor is further configured to clean a testing environment after executing the test classes.

15. A non-transitory computer readable medium storing instructions for implementing an automation suite module for automated functional testing, wherein when executed, the instructions cause a processor to perform the following:
receiving a request for testing an application;
accessing a repository that includes a plurality of test classes related to the request;
creating a plurality of packages, each package including one or more test classes among the plurality of test classes;
causing, in response to receiving the request for testing the application, a graphical user interface (GUI) to display the plurality of packages with their respective test classes;
generating, by utilizing the GUI, a plurality of test blocks by receiving selection of one or more test classes from one or more packages among the plurality of packages, wherein each of the plurality of test blocks is a wrapper for the at least one selected test classes that represents a sprint feature allowing a user to pick and choose what classes to include based on a set amount of time to complete the at least one selected test classes;
generating, by utilizing the GUI, a custom test suite by receiving selection of one or more test blocks from the plurality of test blocks;
executing the test classes based on the custom test suite to test the application, wherein each of the executed test classes executes on a separate thread; and
handling unexpected crashing of drivers during the execution of the test classes by: maintaining a map of the drivers for each of the separate thread based on thread ID (identification), checking for crashed driver by calling API (application programming interface) of the drivers based on a controlled retry loop, and creating a new thread to handle the crashed driver if no response received after the calling.

16. The non-transitory computer readable medium according to claim 15, wherein when executed, the instructions further cause the processor to perform the following:
generating, by utilizing the GUI, a report comprising one or more graphs, one or more charts, or one or more encountered errors, based on the execution of the test classes.

17. The non-transitory computer readable medium according to claim 15, wherein the custom test suite includes a combination of at least one test class from a first package among the plurality of packages and at least one test class from a second package among the plurality of packages, and wherein the at least one test class from the first package is a different type of test class than the at least one class from the second package.

18. The non-transitory computer readable medium according to claim 15, wherein the custom test suite includes a combination of two or more classes each representing a different type of class from one package among the plurality of packages and no classes from other packages among the plurality of packages.

19. The non-transitory computer readable medium according to claim 15, wherein when executed, the instructions further cause the processor to perform the following:
generating, by utilizing the GUI, a plurality of custom test suites by selecting one or more test blocks from the plurality of test blocks for each of the plurality of custom test suites; and
executing each of the plurality of custom test suites including corresponding test classes simultaneously in a parallel mode of operation.

20. The non-transitory computer readable medium according to claim 15, wherein the GUI is a website user interface for configuring test execution settings and display analytics on each execution, and for providing a platform for continuous integration of test results.

* * * * *